Dec. 11, 1956 D. FIRTH 2,773,393
VARIABLE PITCH SHEAVES
Filed June 8, 1954 4 Sheets-Sheet 3
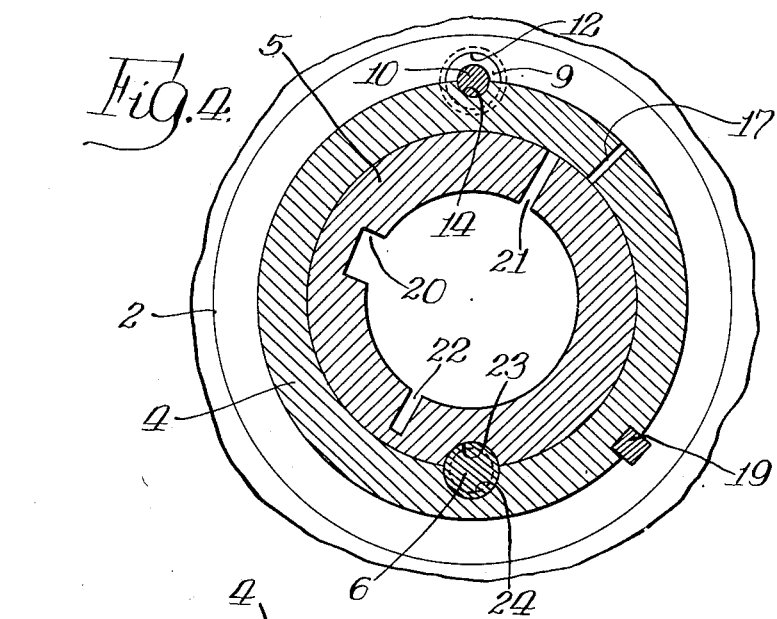
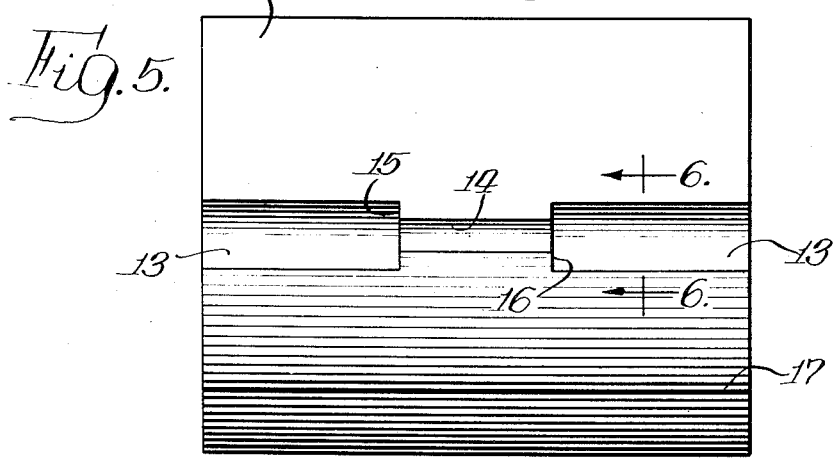
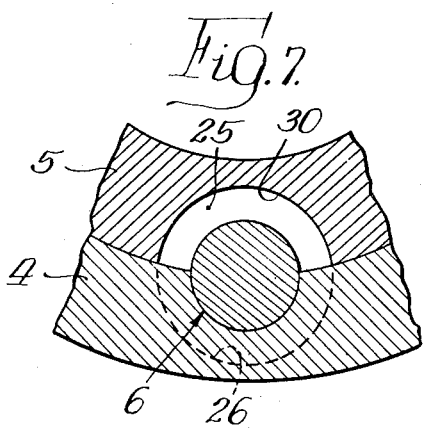
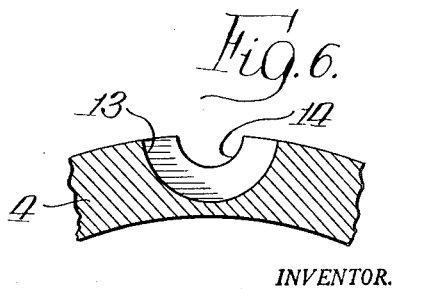
INVENTOR.
David Firth
BY
Osgood H. Dowell
Atty.

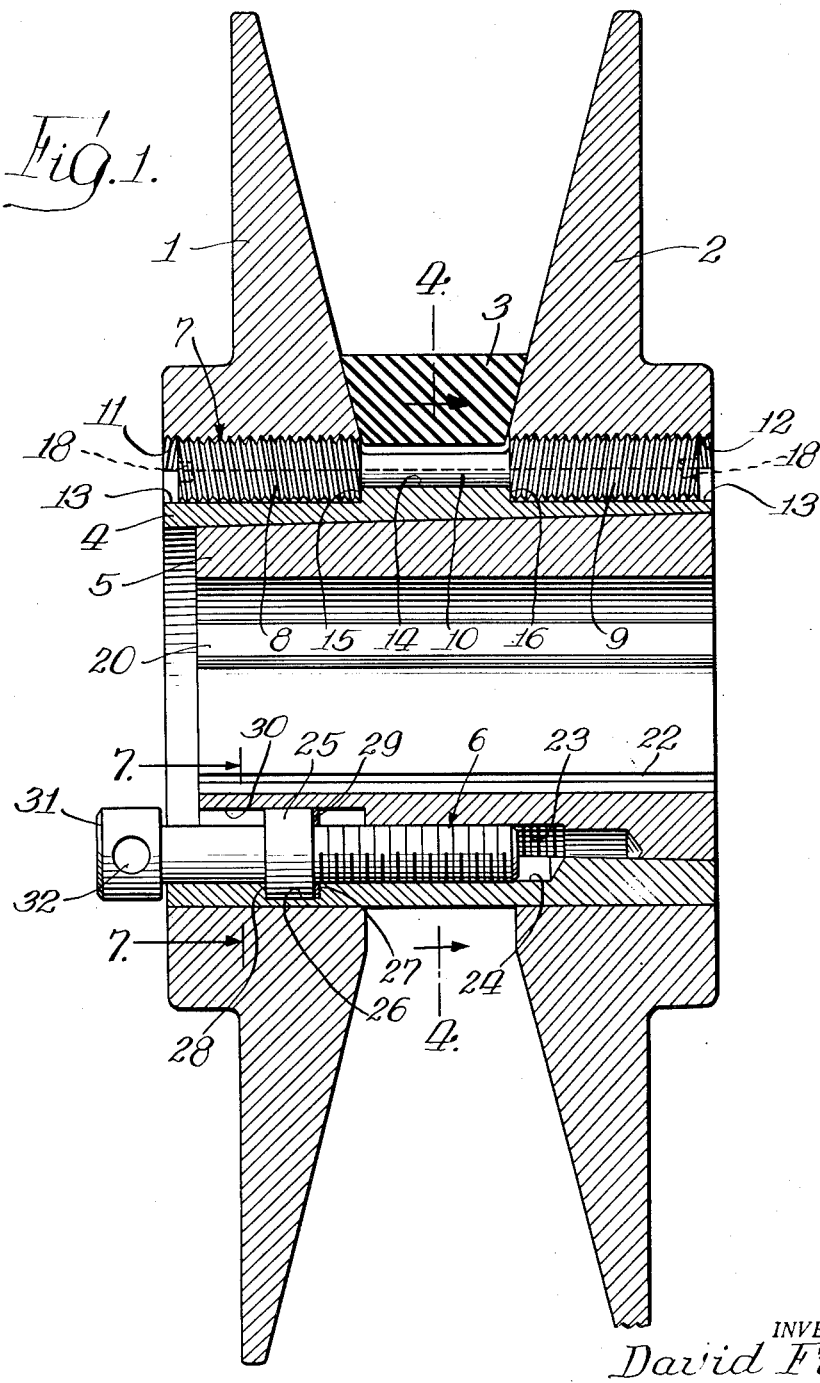

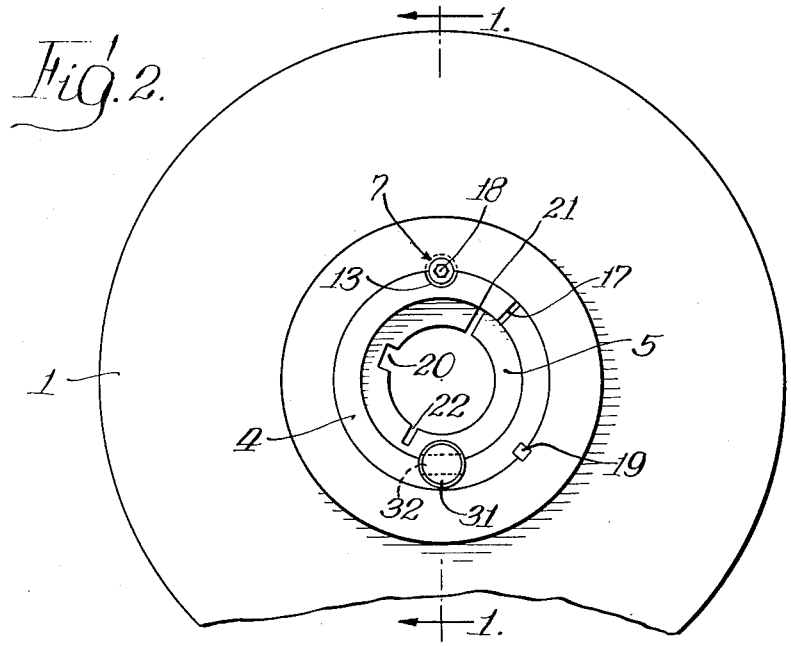
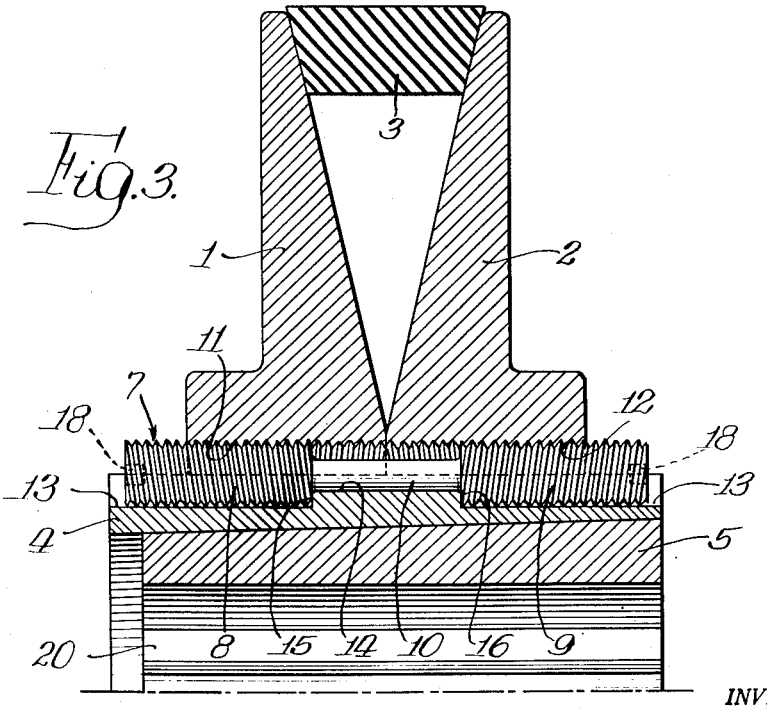

Dec. 11, 1956 D. FIRTH 2,773,393
VARIABLE PITCH SHEAVES
Filed June 8, 1954 4 Sheets-Sheet 4
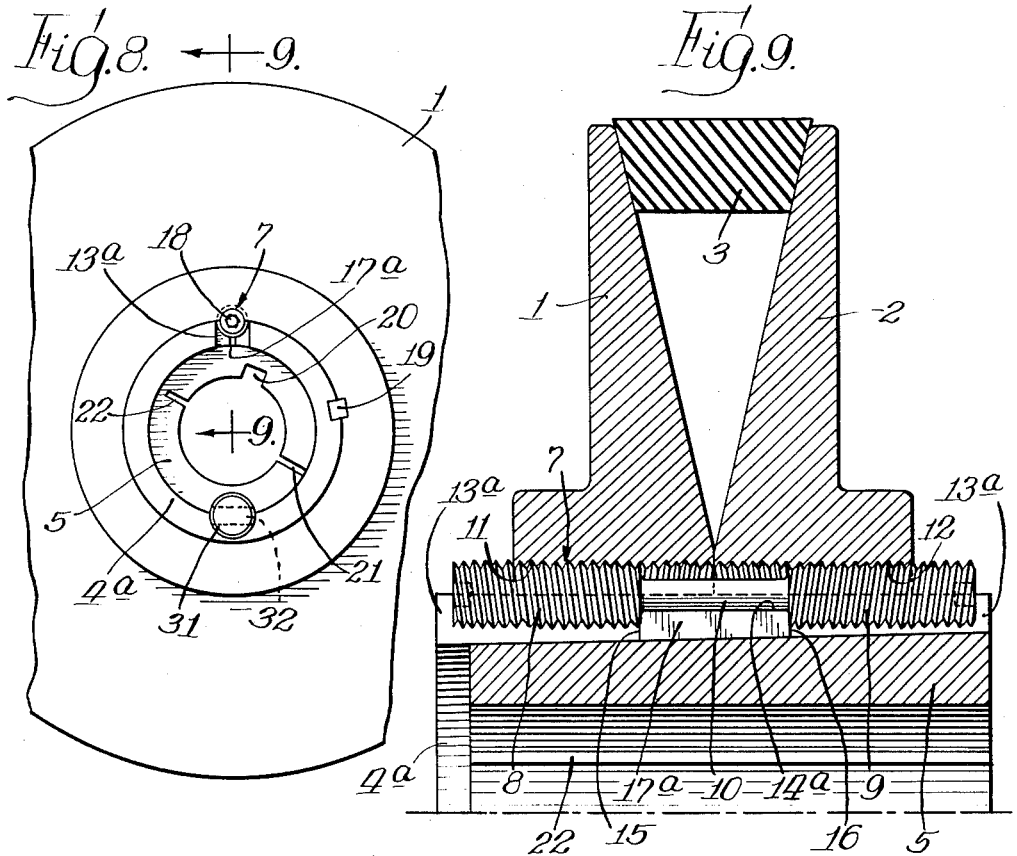
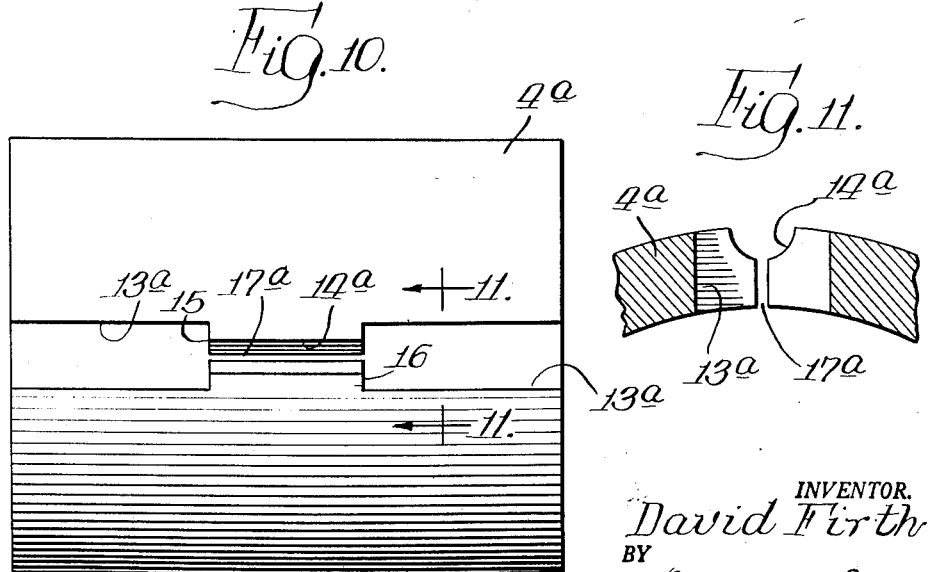
INVENTOR.
David Firth
BY
Osgood H. Dowell
Atty.

United States Patent Office 2,773,393
Patented Dec. 11, 1956

2,773,393

VARIABLE PITCH SHEAVES

David Firth, South Bend, Ind., assignor to Dodge Manufacturing Corporation, Mishawaka, Ind., a corporation of Indiana Application June 8, 1954, Serial No. 435,182

6 Claims. (Cl. 74—230.17)

This invention relates to a variable pitch V-belt sheave of the type having confronting belt-engaging discs shiftable simultaneously in opposite directions by an adjusting screw parallel with the sheave hub and directly connecting said discs.

An object of the invention is to provide a sheave of said type of a construction permitting the belt to be positioned for driving at a minimum effective diameter substantially less than is possible in prior sheaves of said type having the adjusting screw arranged beside the hub. A further object is to provide a construction which is simple and practicable, readily assembled, and which minimizes the required overall length of the sheave.

In a sheave of the type referred to, it is desirable to provide for locking the discs in adjusted position, which in the sheave herein disclosed is accomplished by employment of a longitudinally split hub expansible to grip the discs, the hub being interiorly tapered and attachable to a shaft by wedging a tapered bushing between the hub and shaft. Specifically novel screw means is provided for wedging and dewedging the bushing.

A sheave of one practicable construction embodying the invention is shown for illustration in Figs. 1 to 7 of the accompanying drawings, the remaining figures of which illustrate a modification.

Fig. 1 is a longitudinal section of the illustrative sheave taken on the line 1—1 of Fig. 2, showing the sheave adjusted for holding the V-belt in position for driving at minimum effective diameter.

Fig. 2 is a front end elevation of the sheave on a reduced scale.

Fig. 3 is a half longitudinal section of the sheave shown adjusted for holding the belt in position for driving at maximum effective diameter.

Fig. 4 is a cross-section taken on the line 4—4 of Fig. 1, omitting the belt and showing in elevation the inner face of only the central portion of one of the discs, the outer portion of said one of the discs being broken away.

Fig. 5 is a top plan view of the sheave hub.

Fig. 6 is a detail section on the line 6—6 of Fig. 5.

Fig. 7 is a detail section on the line 7—7 of Fig. 1.

Fig. 8 shows in end elevation a fragment of a sheave modified with respect to the hub recesses and manner in which the hub is split.

Fig. 9 is a half longitudinal section of said modified sheave.

Figure 10 is a plan view of the hub of said modified sheave.

Fig. 11 is a detail section on the line 11—11 of Fig. 10.

Referring to the drawings, the illustrative sheave of Figs. 1 to 7 comprises a pair of confronting annular discs 1 and 2 having conical faces for tractive engagement with the opposite sides of an interposed V-belt 3. The discs are slidably fitted on a hub 4 which in this instance is split longitudinally and interiorly tapered. Fitted in the hub is a tapered split contractible bushing 5 bored to fit a shaft on which the sheave is to be mounted. By means of a screw 6 hereinafter more fully described, the bushing can be wedged between the hub and shaft, thereby contracting the bushing to grip the shaft and expanding the hub to grip the discs. By a reverse operation of said screw the bushing can be dewedged, thereby releasing the discs from gripping engagement with the hub and permitting adjustment of the relative positions of the discs for changing the effective diameter of the sheave.

The discs 1 and 2 are connected by a duplex adjusting screw 7 having right hand threaded engagement with one of said discs and left hand threaded engagement with the other disc, whereby rotation of said screw will effect shifting of said discs simultaneously in opposite directions. Preferably the interengaging threads of said screw and disc 1 and the interengaging threads of said screw and disc 2 are of the same pitch, whereby the axial movements of said discs will be equal.

Said adjusting screw is formed with axially spaced threaded portions 8 and 9 of opposite hands and an intermediate unthreaded portion 10 of substantially smaller diameter than that of said threaded portions. Said threaded portions 8 and 9 are in threaded engagement with the discs in so-called half holes 11 and 12 formed in the inner peripheries of the discs. These half holes are formed by longitudinal open-ended grooves of parti-circular cross-section having tapped walls forming segments of female screw threads respectively matching and interengaged with the threads of said threaded portions of the adjusting screw.

The axis of the adjusting screw 7 is located at such a distance from the hub axis that an imaginary cylindrical surface coincident with the exterior surface of the hub will intersect the screw for its full length or at all cross-sections thereof including cross-sections of the intermediate smaller diameter portion 10 of the screw. In the drawings, the screw axis is shown at a radial distance from the hub axis equal to the radius of the hub, so that in this instance said screw axis is coincident with said imaginary cylindrical surface and practically or nearly half of the screw for its full length is inside of said imaginary cylindrical surface. However the screw axis may be at a radial distance from the hub axis somewhat more or less than said radius, in which cases correspondly less or more than half of the screw will be inside said imaginary cylindrical surface.

The hub 4 is appropriately recessed to contain so much of the adjusting screw as is inside said imaginary cylindrical surface. As shown, the hub has axially spaced recesses 13 to accommodate the threaded portions 8 and 9 of the adjusting screw, and a groove 14 in which the intermediate portion 10 of said screw is accommodated. Said recesses and groove connecting them are shown as of approximately or nearly semicircular in cross-section, providing cylindrical surfaces in which the screw is rotatably fitted.

In the construction shown the hub is split for its full length by a slot 17. When the split hub is expanded to grip the discs, by wedging the bushing 5 between the hub and a shaft, the hub may press the screw outwardly against the threads in the discs, giving an additional locking effect.

The hub holds the adjusting screw from substantial displacement either laterally or radially inwardly. However, if the half holes 11 and 12 in the inner peripheries of the discs should be somewhat more than semicircular in cross-section, the screw would be held from movement radially inwardly, as well as from lateral movement, by its threaded engagement with the discs, in which case the recesses 13 and groove 14 could be of such dimensions that the screw would have a sloppy fit therein.

The portion of the hub between the recesses 13 provides thrust shoulders 15 and 16 in abutting relation to the inner ends of the threaded portions 8 and 9 of the adjusting screw. Thus the hub holds the adjusting screw from axial movement while allowing rotation thereof.

There is shown in each end of the adjusting screw a wrench socket 18 for engagement by a suitable wrench for turning the screw.

In assembling the sheave, the adjusting screw is dropped into the recesses or pockets therefor in the hub, and the discs 1 and 2, being held adjacent to and concentric with opposite ends of the hub, with the half holes 11 and 12 alined with the screw, are pressed toward each other while rotating the screw in a direction to engage its threaded portions in said half holes and thereby to draw the discs onto the hub. To facilitate this operation, the threaded portions 8 and 9 of the adjusting screw are made slightly shorter than the half holes 11 and 12 in the discs, so that in beginning the operation the discs can be piloted or guided by the ends of the hub.

The unique structure above described is simple and practicable for economical manufacture or a mass production basis. An advantage of the structure, in addition to its permissible radial compactness, is that the function of holding the adjusting screw from axial displacement is effected without required enlargement of either the diameter or overall length of the sheave.

When the sheave is adjusted for driving at minimum effective diameter, as in Fig. 1, the discs hold the belt 3 substantially closer to the hub and hence at a substantially less radial distance from the hub axis than would be possible if the adjusting screw 7 were wholly outside of the perimeter of the hub. Thus the invention increases the range of effective diameters of the sheave by lowering the minimum.

There is shown in Figs. 2 and 4 a key 19 for drivingly connecting the sheave discs to the hub, said key being fitted in a longitudinal groove in the hub and slidably fitted in longitudinal grooves in the discs. If said key were omitted, the adjusting screw 7 would serve as keying means, to prevent rotatative movement of the discs relative to the hub, besides which, in the operative use of the sheave, the discs would be gripped by the expanded hub. Under many conditions of service, the key 19 may be unnecessary, though it is nonetheless desirable to relieve the adjusting screw from such strains as might be imposed thereon if said key were omitted.

In the drawings, the numeral 20 designates a keyway in the bushing 5 for engagement by a key for drivingly connecting the bushing to the shaft on which it is to be fitted. The numerals 21 and 22 designate slots in the bushing 5 by which it is split for its full length, the slot 21 being cut through the wall of the bushing and the slot 22 being cut part way through said wall.

As hereinbefore indicated, the bushing 5 can be wedged and dewedged by reverse operations of the wedging screw 6. This screw is arranged parallel with the hub in a hole therefor formed by confronting grooves 23 and 24 in the bushing 5 and hub 4, the walls of said hole being tapped only in the bushing, thereby forming segments of a female thread matching and engaging the thread of said screw. The screw is formed with an annular boss 25 fitted in a transverse groove 26 in the hub, the side walls of which groove provide thrust shoulders 27 and 28 in abutting relation to said boss. The wedging screw 6 is thereby swiveled to the hub 4 in a manner allowing rotation of the screw while preventing axial movement thereof. A washer 29 is preferably employed between 25 and 27. The bushing 5 is recessed as shown at 30 to accommodate the boss 25 and allow axial movement of the bushing relative to the wedging screw and hub.

Said wedging screw 6 extends through the front end of the hub and is provided with a head 31 having a transverse bore 32 in which to insert a rod or bar for use as a handle for turning the screw. By turning the screw in a right hand direction and tightening it against the thrust shoulder 27, the bushing 5 can be tightly wedged between the hub and the shaft on which the sheave is to be mounted. By rotating the screw in a reverse direction and tightening it against the thrust shoulder 28, the bushing can be dewedged, releasing it from gripping engagement with the shaft and releasing the discs from gripping engagement with the hub.

The screw means exemplified by the wedging screw 6 and its connections is similar in principle to the screw means disclosed in the patent to Firth, No. 2,402,743 of June 25, 1946, which could be employed in lieu of the screw means herein disclosed. However, in said patent the wedging screws are operated in one set of holes for wedging and in another set of holes for dewedging, whereas in the illustrative structure the wedging and dewedging are effected by reverse operations of the same screw.

The sheave of Figs. 8 to 11 is of substantially the same construction as that shown in the preceding figures except as to the recessing of the hub and the manner in which the hub is split. In said Figures 8 to 11, the hub is designated by the symbol 4$^a$. The recesses in the hub for accommodating the threaded portions 8 and 9 of the adjusting screw are designated by the symbol 13$^a$. The groove in which the intermediate portion 10 of the screw is fitted, is designated by the numeral 14$^a$. In this instance the recesses 13$^a$ are formed by slots cut through the hub wall. This is advantageous for economy in manufacture and permits use of a thinner walled hub than is required for recesses of the pocket type. Furthermore, the slots providing said recesses are utilized in splitting the hub. That is to say, the hub 4$^a$ is split for its full length by the slots or recesses 13$^a$ and a slit 17$^a$ in the portion of the hub between said recesses, said slit being in a radial plane bisecting the groove 14$^a$ longitudinally thereof.

I claim:

1. A variable pitch sheave comprising a pair of confronting annular discs having conical faces for engaging an interposed V-belt, an exteriorily cylindrical hub on which said discs are slidably fitted, an adjusting screw parallel with the hub and so arranged that an imaginary cylindrical surface coincident with the exterior surface of the hub intersects the screw, said screw having axially spaced threaded portions of opposite hands and an intermediate portion of smaller diameter than that of said threaded portions, said hub having axially spaced recesses accommodating said threaded portions of the screw and having a longitudinal groove connecting said recesses and accommodating said intermediate portion of the screw, said hub having means for holding the screw from axial displacement, said discs having in their inner peripheries longitudinal grooves with tapped walls into which said threaded portions of the screw are screwed, said tapped walls of said grooves providing segments of screw threads respectively matching and interengaged with the threads of said threaded portions of the screw, the discs being simultaneously shiftable axially in opposite directions by rotating the screw, the hub being split longitudinally and expansible to grip the discs.

2. A variable pitch sheave comprising a pair of confronting annular discs having conical faces for engaging an interposed V-belt, an exteriorly cylindrical hub on which said discs are slidably fitted, an adjusting screw parallel with the hub and so arranged that an imaginary cylindrical surface coincident with the exterior surface of the hub intersects the screw, said screw having axially spaced threaded portions of opposite hands and an intermediate portion of smaller diameter than that of said threaded portions, said hub having axially spaced recesses accommodating said threaded portions of the screw and having a longitudinal groove connecting said recesses and accommodating said intermediate portion of the screw, said hub having means for holding the screw from axial displacement, said discs having in their inner peripheries longitudinal grooves with tapped walls into which said threaded portions of the screw are screwed, said tapped walls of said grooves providing segments of screw threads respectively matching and interengaged with the threads of said threaded portions of the screw, the discs being simultaneously shiftable axially in opposite directions by rotating the screw, said recesses and groove in the hub defining cylindrical surfaces in which the adjusting screw is rotatably fitted, the hub being split longitudinally and expansible to grip the discs, the split in the hub being spaced a substantial angular distance from said screw.

3. A variable pitch sheave comprising a pair of confronting annular discs having conical faces for engaging an interposed V-belt, an exteriorly cylindrical hub on which said discs are slidably fitted, an adjusting screw parallel with the hub and so arranged that an imaginary cylindrical surface coincident with the exterior surface of the hub intersects the screw, said screw having axially spaced threaded portions of opposite hands and an intermediate portion of smaller diameter than that of said threaded portions, said hub having axially spaced recesses accommodating said threaded portions of the screw and having a longitudinal groove connecting said recesses and accommodating said intermediate portion of the screw, said hub having means for holding the screw from axial displacement, said discs having in their inner peripheries longitudinal grooves with tapped walls into which said threaded portions of the screw are screwed, said tapped walls of said grooves providing segments of screw threads respectively matching and interengaged with the threads of said threaded portions of the screw, the discs being simultaneously shiftable axially in opposite directions by rotating the screw, said recesses in the hub being formed as slots cut through the hub wall, the hub being split for its full length by said recesses and a split in the portion of the hub between said recesses.

4. A variable pitch sheave comprising a plurality of annular belt-engaging discs, an exteriorly cylindrical hub on which the discs are slidably fitted and shiftable axially for adjusting their positions relative to each other and to the hub, said hub being interiorly tapered and longitudinally split and expansible to grip the discs, a tapered split contractible bushing fitted in the hub and bored to fit a shaft, said hub and bushing being formed with confronting complemental parts of a screw hole arranged substantially parallel with the hub axis and having a threaded wall in one of the hub and bushing and a threadless wall in the other, a screw in said hole in threaded engagement with said one, said screw having thereon an annular boss fitted in a transverse groove on said other, the side walls of which groove provide thrust shoulders, said one of the hub and bushing being longitudinally recessed for a portion of its length to accommodate said boss and allow axial movement of the bushing relative to the hub, the bushing being wedgable between the hub and shaft by tightening the screw against one of said thrust shoulders and dewedgable by tightening it against the other thrust shoulder.

5. A variable pitch sheave comprising a plurality of annular belt-engaging discs, an exteriorly cylindrical hub on which the discs are slidably fitted and shiftable axially for adjusting their positions relative to each other and to the hub, said hub being interiorly tapered and longitudinally split and expansible to grip the discs, a tapered split contractible bushing fitted in the hub and bored to fit a shaft, said hub and bushing being formed with confronting complemental parts of a screw hole arranged substantially parallel with the hub axis and having a threaded wall in the bushing and a threadless wall in the hub, a screw in said hole in threaded engagement with the bushing, said screw having thereon an annular boss fitted in a transverse groove in the hub, the side walls of said groove providing thrust shoulders, the interengaging threads of the screw and bushing being between said boss and the thicker end of the bushing, the bushing being longitudinally recessed for a portion of its length to accommodate said boss and allow axial movement of the bushing relative to the hub, the bushing being wedgeable between the hub and shaft by tightening said screw against one of said thrust shoulders and dewedgeable by tightening the screw against the other thrust shoulder.

6. In a variable pitch sheave construction, an exteriorly cylindrical hub member having axially aligned and spaced apart recesses in its periphery opening into the hub ends respectively, a groove of less depth than said recesses also in said periphery between said recesses, a pair of annular discs having confronting conical faces and having bores slidably fitted on said hub, longitudinal axially aligned half-holes in the disc bores having particylindrical tapped walls extending entirely through the discs respectively, a duplex adjusting screw parallel with the hub having threaded ends of opposite hands in said recesses respectively spaced inwardly from the outer ends of the recesses, said screw having an intermediate portion of reduced diameter in said groove of substantially the same axial length as the groove, the walls of said half holes of the discs respectively being tapped for threaded engagement with the adjacent threaded end of the screw, whereby the discs by rotation of said screw are simultaneously shiftable axially in opposite directions from a position in which the discs are relatively far apart to a position in which they are in facial abutment, the screw remaining axially stationary with the hub, and the discs may be initially located on the ends of said hub before engaging the screw.

References Cited in the file of this patent
UNITED STATES PATENTS

| | | |
|---|---|---|
| 2,219,856 | Weston | Oct. 29, 1940 |
| 2,234,917 | Koch | Mar. 11, 1941 |
| 2,648,988 | Knudsen | Aug. 18, 1953 |
| 2,651,209 | Williams | Sept. 8, 1953 |